United States Patent
Binder et al.

[11] Patent Number: 5,932,094
[45] Date of Patent: Aug. 3, 1999

[54] COLLECTION CONTAINER WITH TRANSPORT PUMP

[75] Inventors: Bruno Binder, Dornhan; Wolfgang Riegert; Klaus Riegert, both of Alpirsbach, all of Germany

[73] Assignee: Alpirsbacher Maschinenbau GmbH & Co., Alpirsbach-Peterzell, Germany

[21] Appl. No.: 08/793,535

[22] PCT Filed: Jun. 27, 1996

[86] PCT No.: PCT/DE96/01139

§ 371 Date: May 13, 1997

§ 102(e) Date: May 13, 1997

[87] PCT Pub. No.: WO97/01417

PCT Pub. Date: Jan. 16, 1997

[30] Foreign Application Priority Data

Jun. 29, 1995 [DE] Germany .................. 295 10 514

[51] Int. Cl.⁶ .................. B01D 21/06; B01D 21/18
[52] U.S. Cl. .................. 210/171; 210/524; 210/528
[58] Field of Search .................. 210/171, 524, 210/525, 528, 532.1

[56] References Cited

U.S. PATENT DOCUMENTS

| | | | |
|---|---|---|---|
| 1,717,764 | 6/1929 | O'Olier | 210/528 |
| 2,126,884 | 8/1938 | Hurdinya | 210/528 |
| 2,227,099 | 12/1940 | Mallony | 210/528 |
| 2,980,934 | 4/1961 | Heindorf | 210/528 |
| 3,722,698 | 3/1973 | Hampton | 210/528 |
| 3,800,955 | 4/1974 | Edgerton et al. | 210/528 |
| 4,635,408 | 1/1987 | Burke et al. | |
| 4,992,167 | 2/1991 | Uchiyama | 210/171 |
| 5,219,470 | 6/1993 | Bradley et al. | 210/525 |
| 5,738,782 | 4/1998 | Schüfur et al. | 210/171 |

FOREIGN PATENT DOCUMENTS

| | | |
|---|---|---|
| 0269124 | 6/1988 | European Pat. Off. . |
| 0518095 | 12/1992 | European Pat. Off. . |
| 1316322 | 4/1963 | France . |
| 2176618 | 11/1973 | France . |

OTHER PUBLICATIONS

Patent Abstracts of Japan, vol. 18, No. 575 (C–1268), Nov. 4, 1994 & JP 6210198 (Enomoto Kogyo), Aug. 2, 1994.

Primary Examiner—Christopher Upton
Attorney, Agent, or Firm—Bachman & Lapointe, P.C.

[57] ABSTRACT

A collection container with transport pump (4) for conveying liquids containing production residues, for instance chips, coolant and lubricant. The collection container (1) is developed as a cylindrical pot with a substantially flat container floor (5). A rake which travels over the container floor (5) conducts the chips which have deposited on the container floor to the transport pump (4). The collection container thus has a slight structural height and assures optimal removal of the chips by means of the transport pump.

7 Claims, 3 Drawing Sheets

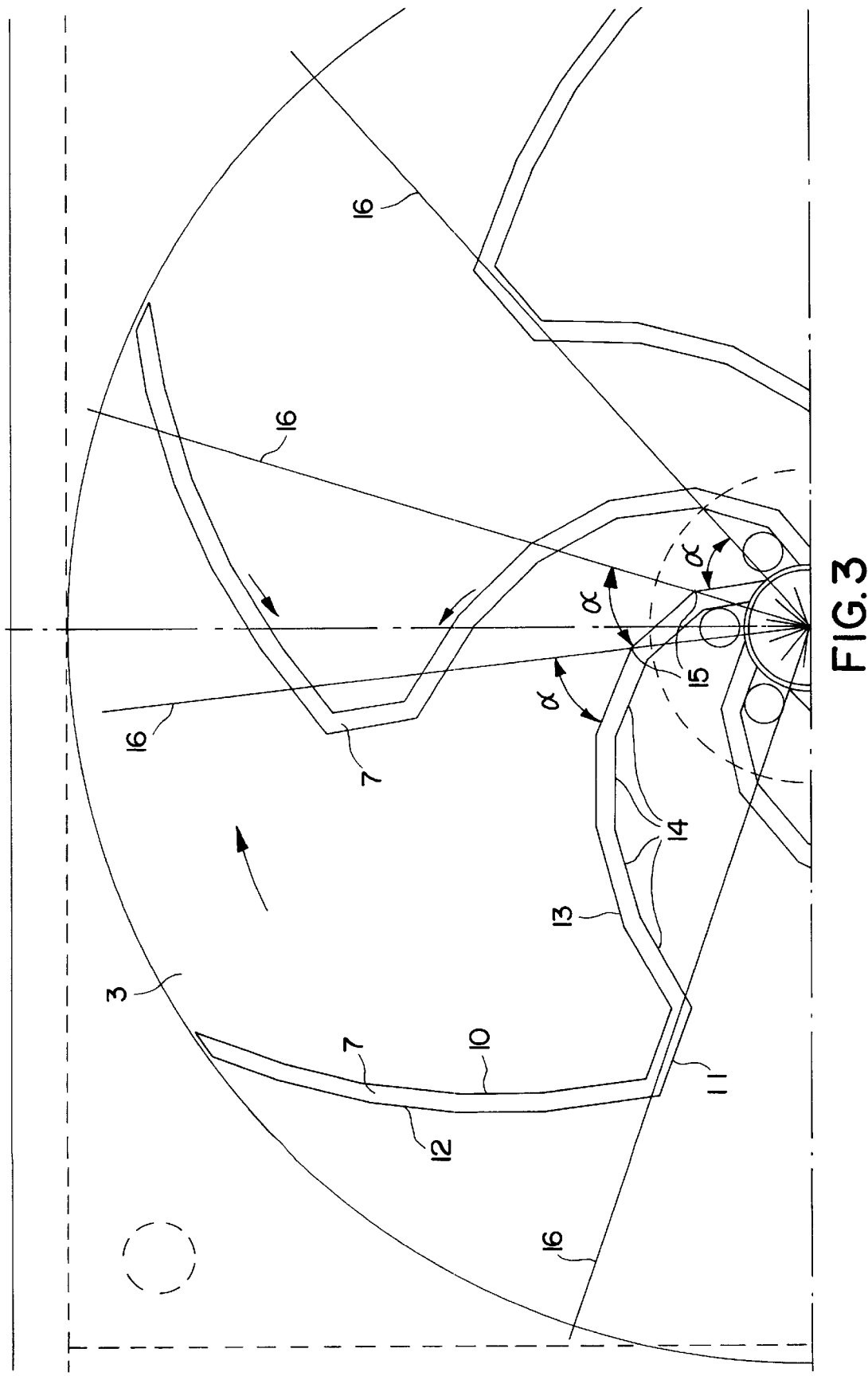

COLLECTION CONTAINER WITH TRANSPORT PUMP

BACKGROUND OF THE INVENTION

1. Field of the Invention

The present invention relates to a collection container with transport pump for pumping liquids containing production residues such as, for instance, chips, coolant and lubricant, in accordance with the preamble to claim 1.

Machining residues such as are produced, for instance, in the machining industries must be removed from the machine, together with the coolant or lubricant used there, in order to separate the chips from the liquid elsewhere. For this, the mixture is pumped or drawn through pipelines.

2. Description of the Prior Art

In the systems known up to now, the comminuted chips, as for instance in EP 518 095, are collected in a collection container having a slight inclination, so that the chips are conveyed by the flow of the fluid to the pump, which is arranged at the lowest point. Another known variant consists of a funnel-shaped container with relatively steep walls, so that the chips pass by gravity into the pump, which is arranged at the lowest point. The known collecting containers have been found to have the disadvantage that either the transport of the chips taken place only when there is only a slight volume of feed stream or the containers have too great a structural height.

From EP 0 269 124 a highly consistent tower of material is known which has the features contained in the preamble to the main claim. In that device, scraper plates are arranged on the radically extending rake arms, which plates bring the material to be removed by pumps arranged below the floor of the container together on a circular line around the center of the circular-cylindrical collection container. In this known device, there is the danger, due to the development of the rake arm, that larger particles will become jammed below the scraper. Furthermore, a large structural height is necessary due to the arrangement of the pumps below the floor of the collection container.

French A-2 176 618 discloses a device for the dosaging of granulate in which rake arms are present in a cylindrical collection container they conducting the material lying on the bottom of the container to openings arranged on its outer circumference. The rake arms have an inner rake-arm section with a curved transport surface and an outer rake-arm section with a straight transport surface.

Japanese A 62 10 198 discloses a device for drawing coolant which contains cutting ships out of a collection container. For this purpose a suction pipe which is connected at its other end with a corresponding separator for separating the coolant from the chips extends into the collection container. In addition, a corresponding vacuum suction device is provided.

SUMMARY OF THE INVENTION

The object of the present invention is to provide a device which is of only slight structural heights and nevertheless assures an optimal removal of the chips by means of the transport pump.

This object is achieved in accordance with the invention by a collection container having the features set for in the main claim. Further advantageous embodiments can be noted from the dependent claims.

The collection container of the invention is developed as a cylindrical pot having a substantially flat container floor and a rake which travels over the container floor and conducts the chips which have deposited on the container floor to the transport pump. Such a collection container is of reduced height and is specified essentially only by the volume which is received and must be transported away within a given period of time. The machining residues can be fed to the collection container at any desired point. The same is true of the carrier fluid. The floor of the container is flat so that the rake, which travels over the floor of the container parallel to its surface can bring the chips together at a point where the transport pump is arranged. To assist in this, the floor of the container can, if the rake is developed accordingly, also have a slight inclination. The transport pump is arranged off center in the collection container. With this development, it is particularly advantageous that the transport pump need not be arranged below the floor of the container, which can easily lead to clogging since the chips/liquid ratio is unfavorable. The transport pump is arranged above the floor of the container in order to draw off the eddied chips together with the liquid and conduct them further through the connected pipeline. Clogging of the transport pump can be substantially avoided by this, since the transport pump only draws in as much as it can in accordance with its capacity.

The rake has at least one rake arm which rotates around the vertical axis of the collection container. The number of rake arms depends on the quantity of chips produced and the suitable speed of rotation. The rake arm has an inner rake-arm section with a convex transport surface and an outer rake-arm section with a concave transport surface. The chips lying in the outer region of the floor of the container are conducted inward towards the radially extending collection section of the rake arm while the chips lying in the inner region of the floor of the container are conducted inward to the radially extending collection section of the rake arm. Deviations from this preferred shape are possible for instance by approximation geometries (approximating of straight lines, ellipses, circles).

The rake arm concentrates the chips on a circular line around the center of the floor of the container. This simplifies the construction since the drive of the rake is also arranged at the center.

In a further embodiment, the rake arm preferably has a radially extending collection section, along the outward facing end of which the outer rake-arm section having the concave transport surface is arranged and along the inward facing end of which the inner rake-arm section having the convex transport surface is arranged. The collection section moves on a circular line on which the transport pump is also arranged. The radial orientation of the collection section prevents radial movement of the chips in said region. An arrangement differing from the radial direction produces movement of the chips to the point of inflection between collection section and corresponding adjacent concave or convex transport surface. In principle, the concave transport surface can pass directly into the convex transport surface so that a V-shaped collection section results. In such case, however, there is an increased danger of jamming of the chips.

The rake arm advantageously has a transport surface which is inclined to the radial line by an angle $\alpha$ in order to concentrate the chips on the floor of the container. By the particular development of the rake arms the chips are brought together from any given point of the container floor and concentrated, so that, when they are moved past the transport pump, they can be drawn in by the latter. The angle $\alpha$ is between 30° and 90°, and preferably between 60° and 65°. As already indicated above, the angle α represents a measurement of the inclination of the transport surface with respect to the radial line. Depending upon whether a concave transport surface or a convex transport surface is concerned, the deviation from the radial line lies in the one direction or the other. In this way, the chips present on the transport surface are pushed by the frictional-force portion of the force vector in the direction of conveyance. The frictional force between floor and chip as well as between transport surface and chip opposes the centrifugal force. It has therefore been found that the angles indicated above are best.

The speed of rotation of the rake is 0.5 to 50 rpm, and preferably 3 rpm.

The height of the transport surface depends on the requirements for optimal operation and, in accordance with one advantageous embodiment, the height of the transport surface is about 10 mm.

By the use of several rake arms, preferably 4 to 6, individual storage chambers are formed within which the chips collect. This has the result that a given amount, dependent also on the height of the transport surface, is fed to the transport pump. The pump can then be adapted to the amount to be pumped off and the suction power of the pump.

The invention will be explained in further detail below on basis of an embodiment, read in conjunction with the accompanying drawings.

BRIEF DESCRIPTION OF THE DRAWINGS

FIG. 3 is an enlarged showing of a few rake arms.

DESCRIPTION OF THE PREFERRED EMBODIMENT

Figure 1:
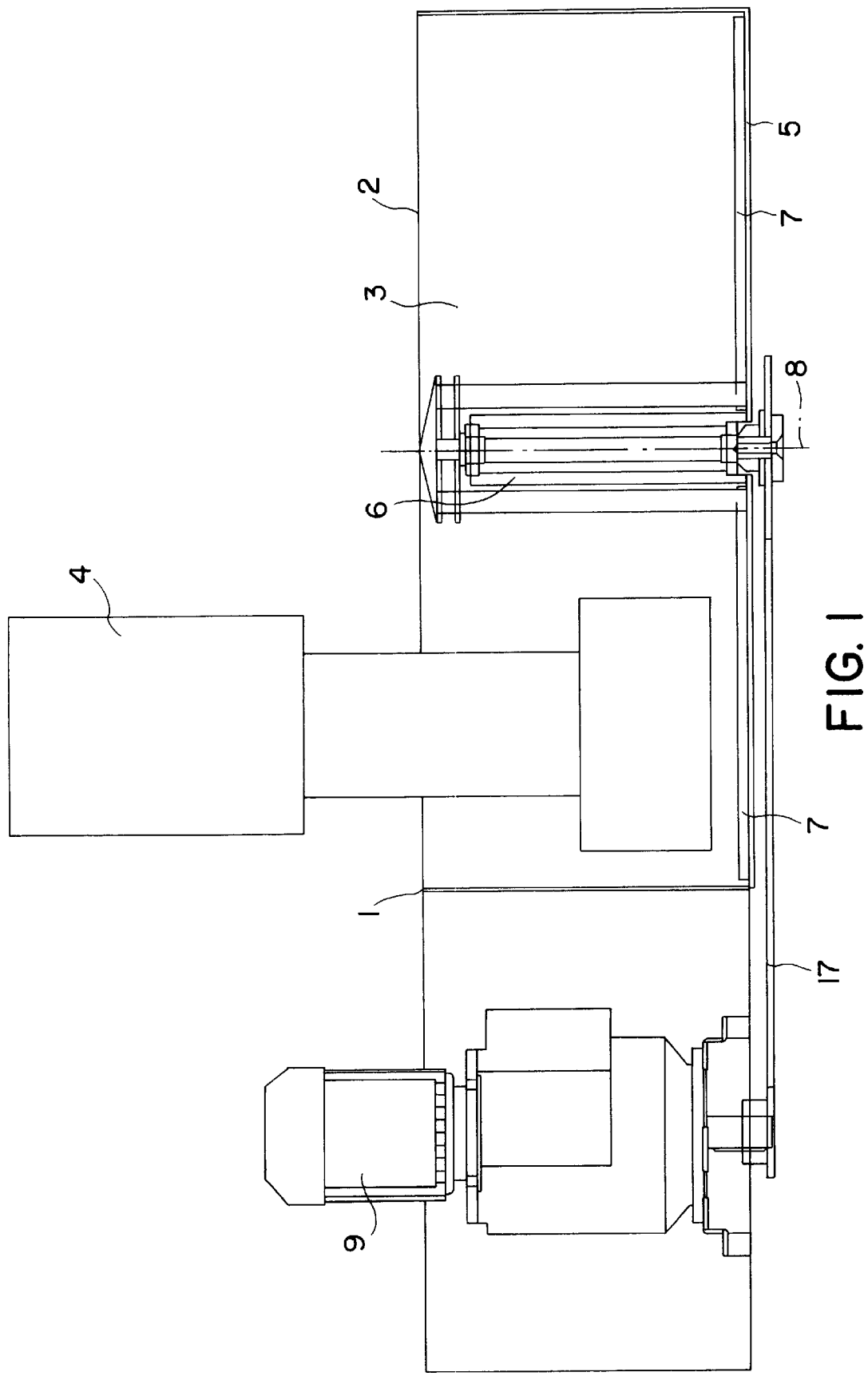
FIG. 1 is a diagrammatic sectional view through the collection container.

FIG. 1 shows a collection container 1 with the receiving space 3 for the chips and the coolant or lubricant extending up to the upper end of the container. A transport pump 4 arranged at a distance from the floor of the container 5 extends into the cylindrical receiving space 3. The transport pump 4 draws the metal chips, together with fluid, off from the floor 5 of the container, the chips being brought by means of the rake 6 into the region of the inlet opening of the transport pump 4. The rake 6 consists, in the embodiment shown, of six rake arms 7 which rotate around the axis 8 of the collection container. In this way, individual storage chambers are formed within which the chips accumulate. An accumulation of chips which is too large for the corresponding rake arm is avoided. This also permits a low height of the transport surface 10 (FIG. 2) of the rake arms. Four to eight rake arms have proven advantageous depending on the size of the installation. In principle, a larger number of storage chambers is also possible. The rake 6 is driven by a belt 17 and a laterally arranged drive unit 9. The rake arms 7 lie on the floor 5 of the container so as to contact the chips and feed them to the transport pump 4. In order that the rake arms 7 cannot jam with the container floor 5, the rake 6 has play so that a lifting of the rake 6 or a lifting of the rake arms 7 from the container floor 5 is possible.

Figure 2:
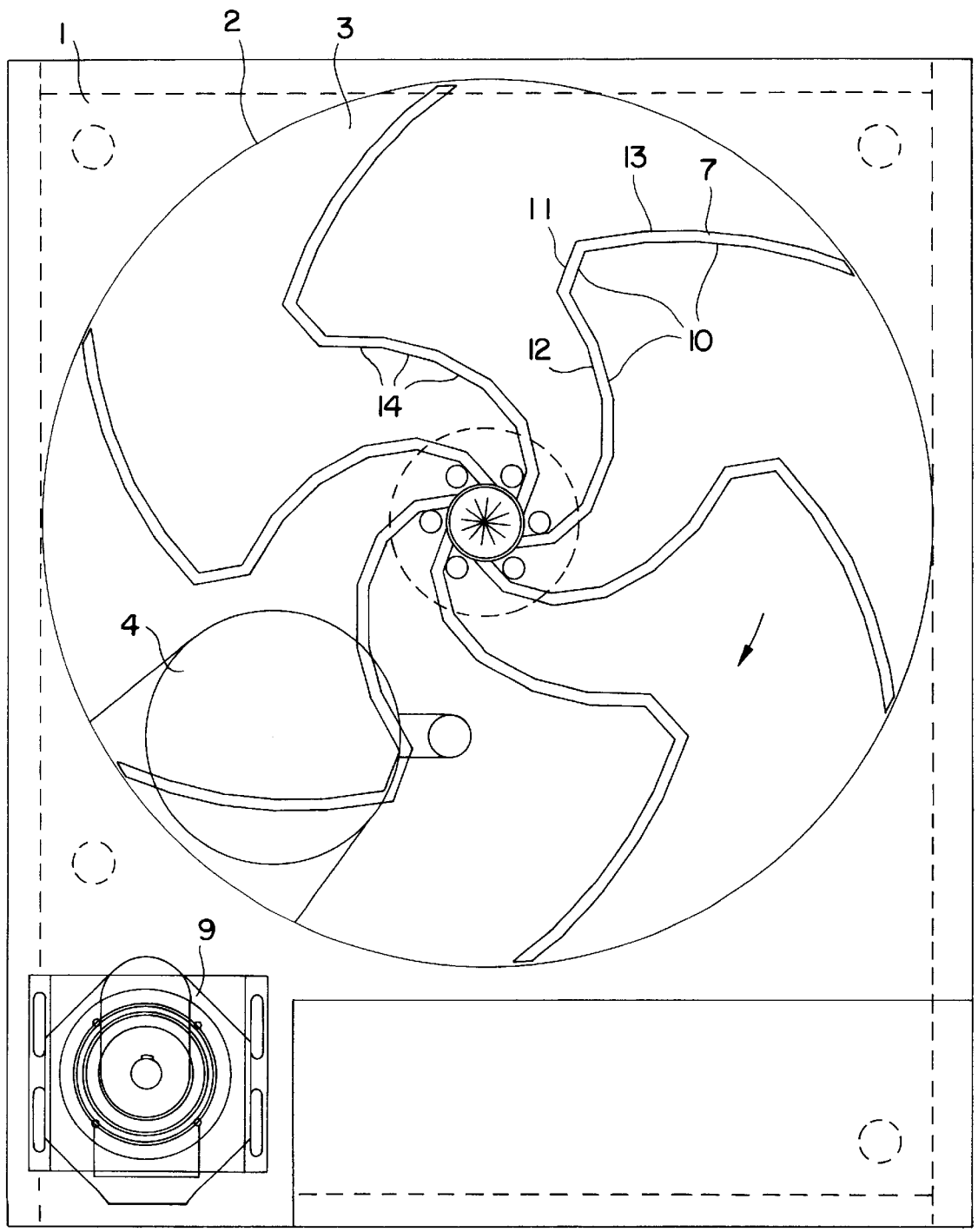
FIG. 2 is a top view of the collection container.

FIG. 2 shows a diagrammatic top view of the collection container 1 from which the arrangement of the transport pump 4 in the receiving space 3 and the development of the rake arms 7 can be noted. The rake arms 7 are made of metal and have a height of about 10 mm. The transport surface 10 of each rake arm by which the chips are fed to the transport pump 4 have a collection section 11 and, adjoining same on the inside, a convex section 17 and, on the outside, a concave section 13 with correspondingly developed transport surface. This development has the result that both chips arranged in the inner region and chips arranged in the outer region are fed, as indicated by the arrows, to the collection section 111 which travels precisely below the intake opening of the transport pump 4. As can be noted from FIG. 3, the collection section 11 lies on the radial line 16 extending from the center while the convex section 12 and the concave section 13 deviate by an angle α from the radial line. The sections 12 and 13 approximate an arcuate line, the construction being effected in the manner that, starting from the center point (axis of the collection container), each individual segment 14 deviates by a given angle α from the radial line 16 extending through the base point 15 (see FIG. 3). In the embodiment shown the angle α is between 60° and 65° and the rotary arms rotate at 3 rpm.

It has been found that with this construction an optimal removal of the chips without clogging of the transport pump is assured.

We claim:

1. A collection container with transport pump for conveying liquids containing production residues, the collection container (1) comprising a cylindrical pot and having a rake (6) with at least one rake arm (7) which rotates around the vertical axis (8) of the collection container which rake concentrates the chips present on a substantially flat floor of the container on a circular line around the center of the container floor (5) and feeds them to a transport pump, wherein the transport pump (4) extends downwardly into the collection container (1) to a point above the floor and draws the residue upward from the container floor (5), and the rake arm (7) rests on the container floor and has an inner rake-arm section (12) with a convex transport surface and an outer rake-arm section (13) with a concave transport surface.

2. A collection container according to claim 1, wherein the rake arm (7) has a radially extending collection section (11) between the inner rake-arm section (12) and the outer rake-arm section (13).

3. A collection container according to claim 1, wherein the inner transport surfaces of the rake-arm sections are inclined to the radial line (16) by an angle α which is between 30° and 90°.

4. A collection container according to claim 3, wherein the angle is between 60° and 65°.

5. A collection container according to claim 1, wherein that the speed of rotation of the rake (6) is 0.5 to 50 revolutions per minute.

6. A collection container according to claim 5, wherein the speed is 3 revolutions per minute.

7. A collection container according to claim 1, wherein that the heights of the transport surfaces are about 10 mm.

* * * * *